July 26, 1938.　　　　R. E. MARBURY　　　　2,125,077
CAPACITOR PROTECTIVE SYSTEM
Filed Sept. 26, 1935
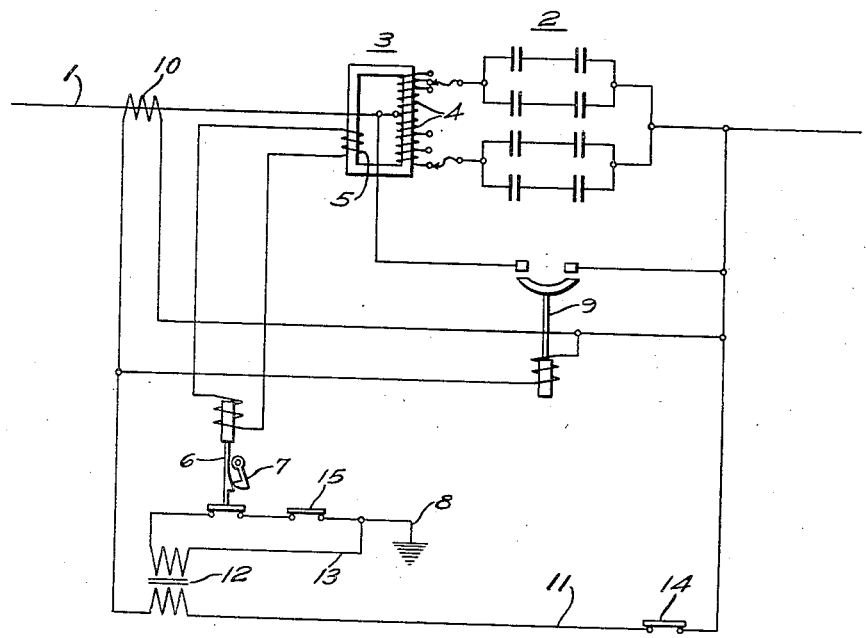
WITNESSES:
C. J. Weller.
G. O. Harrison.
INVENTOR
Ralph E. Marbury.
BY
ATTORNEY Patented July 26, 1938

2,125,077

UNITED STATES PATENT OFFICE 2,125,077

CAPACITOR PROTECTIVE SYSTEM

Ralph E. Marbury, Wilkinsburg, Pa., assignor to Westinghouse Electric & Manufacturing Company, East Pittsburgh, Pa., a corporation of Pennsylvania Application September 26, 1935, Serial No. 42,181

2 Claims. (Cl. 175—294)

My invention relates to protective apparatus for capacitors and particularly to a differential relay arrangement for detecting and clearing internal faults in banks of capacitors. Although not limited thereto, my invention is particularly applicable to power capacitors as used in series with alternating-current power circuits for line drop compensation, or in parallel to the circuit for power factor correction.

In series capacitor installations, it is desirable to use standardized capacitor units of comparatively low voltage rating, such as 460 volts effective, and to obtain the desired total values of capacitance and full-load voltage drop by means of a series-parallel connection of a number of units. In such installations, the failure of a capacitor unit produces little or no change of line current, and internal faults of the capacitors are, accordingly, difficult to detect by the usual methods.

It has heretofore been proposed to divide the series-parallel capacitor installation into two symmetrical sections and to use a differential relay system for detecting a difference of current between the sections in the event of an internal fault. So far as I am aware, however, such arrangements of the prior art have required special relay constructions, or have involved the introduction of material values of inductance in the loop circuit formed by the two capacitor sections.

In one construction of the prior art, a current transformer is included in series with each of the two capacitor sections, and the secondary windings of the current transformers are connected differentially to a protective relay. Although satisfactory for protection against internal faults, such an arrangement may create a resonance condition at some frequency above the line frequency, because of the exchange of energy between the transformer leakage magnetic circuit and the series capacitors. If both branches of the local circuit formed by the transformers and capacitors have identical constants, they constitute two series resonant circuits of the same frequency. The current in these circuits may reach high values if a voltage harmonic of approximately their natural frequency is present in the line circuit. If the parallel branches of the local circuit have unequal constants, a parallel resonance condition may be approached for some harmonic of line current, with attendant high current values. In either case, the flow of high frequency power in the local circuit causes overheating and possibly destruction of the current transformers.

In accordance with my invention, I reduce the amount of inductance present in the local circuit to such a low value that the resonant frequency of the latter circuit is raised to a value considerably above the harmonics of line voltage and current. The likelihood of excessive harmonic currents is accordingly reduced, although the advantages of the differential protective arrangement are retained.

It is accordingly an object of my invention to provide a novel differential protective system for capacitors which shall require a minimum value of effective inductance in the local circuit of the capacitors.

Another object of my invention is to provide a novel differential protective system of general utility in connection with banks of capacitors.

Other objects of my invention will become evident from the following detailed description taken in conjunction with the accompanying drawing, in which the single figure is a diagrammatic view of one phase of a protective system embodying my invention.

Referring to the drawing in detail, the main conductor 1 may be a phase conductor of an alternating-current transmission or distribution feeder on which improved voltage regulation is desired. A capacitor bank 2, designed in known manner to compensate for the reactance drop and part of the resistance drop of the conductor 1, is divided into a pair of symmetrical sections as indicated. A special current transformer 3 having two primary windings 4 of equal number of turns, and a secondary winding 5, is provided for obtaining a differential indication of electrical conditions in the capacitor bank 2. The primary windings 4 are connected in series with the two sections of capacitor bank 2, respectively, in such relative directions that their magnetomotive forces normally oppose, and the secondary winding 5 is connected to a protective relay 6.

It is the usual practice to manufacture capacitor units, such as provided in the bank 2, with a tolerance as to capacitance value of the order of ±7%. When an even number of these units is divided into two sections, therefore, a difference of capacitance between the two sections ordinarily exists. If any form of differential protective apparatus, is applied to the two sections, the differential variable would ordinarily not be zero but might be of appreciable value during normal conditions. A change of capacitance of one of the units, preceding failure, might raise or lower the differential variable, depending upon whether the failing unit were in the section of larger or smaller total capacitance. In order to eliminate faulty operation from this cause, I provide taps on the primary windings 4 of the transformer 3 to permit equalization of the magnetomotive forces produced by the windings. Preferably one winding 4 is provided with coarse taps, and the other winding 4 with fine taps, as indicated in the drawing, in order to permit fine and coarse equalizing adjustments. The relay 6 may be of any suitable current responsive type designed to operate at a predetermined value of current and to remain in operated position until manually reset. Although, in practice, one of the known forms of adjustable overcurrent relays would be used in this application, I have diagrammatically shown the relay 6 as a simple plunger type relay provided with a latch 7 for manual resetting.

In order to permit adjustment or repair of the relay 6 without interrupting the line circuit 1, the transformer 3 is preferably of the insulating type, and the relay 6 is maintained at ground potential, as indicated diagrammatically by the connection 8.

The relay 6 is arranged to control any suitable means for removing the capacitor bank 2 from service in the event of an internal fault. In a series capacitor installation, as shown, the capacitor bank 2 is preferably removed from service by means of a short-circuiting contactor 9. For other applications of the capacitor bank, other forms of switching devices, known in the art, would be provided for removing the bank from service.

The contactor 9 is preferably maintained at line potential, and is energized by means of a low-voltage or non-insulating current transformer 10, also maintained at line potential. In order to control the contactor by means of the relay 6, the operating coil of the contactor 9 is normally short-circuited by a connection 11 which includes the primary winding of an insulating current transformer 12. The contacts of the relay 6 are included in series in the secondary circuit 13 of the current transformer 12. In this arrangement, various other protective devices, operating at line potential, may be included in the short-circuiting connection 11, as indicated at 14. Protective devices which operate at ground potential, however, are included in the secondary circuit 13, as indicated at 15.

The operation of the apparatus shown in the drawing will be obvious from the above. During normal conditions, the line current divides equally between the equal reactance sections of the capacitor 2, and the magnetomotive forces produced by the primary windings 4 of the transformer 3 neutralize each other. The core of the transformer 3 accordingly remains de-energized, and except for negligible leakage reactance effects, the reactance of the transformer 3 to line currents is negligible.

In the event of an internal fault in the capacitor bank 2, one of the primary windings 4 produces a greater magnetomotive force than the other, the core of transformer 3 becomes energized by an alternating flux, and an alternating current circulates through the relay 6. If this current exceeds the relay setting, the relay operates to open position and latches open, maintaining the secondary circuit 13 of the insulating current transformer 12 open.

Upon opening of its secondary circuit 13, the transformer 12 introduces a high impedance in its primary circuit, in known manner, and the resulting re-distribution of current in the secondary circuit of the current transformer 10 forces an operating current through the coil of contactor 9. The contactor 9, accordingly, closes to short-circuit the capacitor bank 2. When the fault has been repaired, the relay 6 is reset to the position shown.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In an alternating current system of transmission and distribution, an alternating-current power circuit, a series capacitor bank included in said power circuit, said capacitor bank having a pair of sections connected in parallel branch circuits, a current transformer having a secondary winding and a pair of primary windings, said primary windings being connected in said branch circuits in such relative directions as to produce opposing magnetomotive forces and thereby reduce the magnetizing reactance of said transformer, said transformer having leakage reactance of insufficient value to produce resonance with said capacitor sections at the lower harmonic frequencies of line current of said power circuit, and a fault-responsive device connected to said secondary winding.

2. In an alternating-current system of transmission and distribution, an alternating-current power circuit, a series capacitor bank included in said power circuit, said capacitor bank having a pair of sections connected in parallel branch circuits, said sections consisting of standardized units of approximately uniform capacitance within predetermined limits of tolerance, a current transformer having leakage reactance of insufficient value to produce resonance with said capacitor sections at the lower harmonic frequencies of line current of said power circuit, said current transformer having a secondary winding and a pair of tapped primary windings, each of said primary windings having a plurality of adjusting taps, the taps of one of said primary windings corresponding to different numbers of turns from the taps of the other of said windings, said primary windings being connected in said branch circuits in such relative directions as to produce opposing magnetomotive forces and thereby reduce the magnetizing reactance of said transformer, and a fault-responsive device connected to said secondary winding.

RALPH E. MARBURY.